United States Patent
Yamada et al.

(10) Patent No.: US 11,708,450 B2
(45) Date of Patent: Jul. 25, 2023

(54) COMPOSITION FOR FORMING METALLIC LUSTER FILM, METALLIC LUSTER FILM, AND ARTICLE

(71) Applicants: FUJIFILM BUSINESS INNOVATION CORP., Tokyo (JP); NATIONAL UNIVERSITY CORPORATION CHIBA UNIVERSITY, Chiba (JP)

(72) Inventors: Wataru Yamada, Ebina (JP); Satoya Sugiura, Ebina (JP); Katsuyoshi Hoshino, Chiba (JP); Rihito Tamura, Chiba (JP); Kenta Horikoshi, Chiba (JP); Minako Tachiki, Chiba (JP)

(73) Assignees: FUJIFILM BUSINESS INNOVATION CORP., Tokyo (JP); NATIONAL UNIVERSITY CORPORATION CHIBA UNIVERSITY, Chiba (JP)

( * ) Notice: Subject to any disclaimer, the term of this patent is extended or adjusted under 35 U.S.C. 154(b) by 329 days.

(21) Appl. No.: 17/114,921

(22) Filed: Dec. 8, 2020

(65) Prior Publication Data

US 2021/0179773 A1     Jun. 17, 2021

(30) Foreign Application Priority Data

Dec. 13, 2019   (JP) .................. 2019-225063

(51) Int. Cl.
   *C08K 3/08*       (2006.01)
   *C08G 61/12*     (2006.01)
   *C08L 65/00*     (2006.01)

(52) U.S. Cl.
   CPC .......... *C08G 61/126* (2013.01); *C08K 3/08* (2013.01); *C08L 65/00* (2013.01); *C08K 2003/085* (2013.01); *C08K 2003/0856* (2013.01); *C08L 2203/16* (2013.01)

(58) Field of Classification Search
   CPC ............ B05D 5/067; C08G 2261/11; C08G 2261/122; C08G 2261/1412; C08G 2261/1424; C08G 2261/3223; C08G 2261/43; C08G 2261/522; C08G 2261/712; C08G 61/126; C08K 2003/085; C08K 2003/0856; C08K 3/08; C08L 2203/16; C08L 65/00; C09D 165/00; C09D 5/032

See application file for complete search history.

(56) References Cited

U.S. PATENT DOCUMENTS

| | | | |
|---|---|---|---|
| 5,093,033 A | 3/1992 | Feldhues et al. | |
| 5,728,321 A * | 3/1998 | Abe ................. | H01B 1/128 252/500 |
| 2003/0161941 A1 | 8/2003 | Kirchmeyer et al. | |
| 2015/0107638 A1* | 4/2015 | Takahashi ........... | B82Y 30/00 136/205 |
| 2016/0075917 A1 | 3/2016 | Hoshino et al. | |
| 2019/0338162 A1 | 11/2019 | Hoshino et al. | |
| 2020/0319568 A1* | 10/2020 | Hoshino ............. | C08J 3/005 |

FOREIGN PATENT DOCUMENTS

| | | |
|---|---|---|
| CN | 87 1 05806 A | 5/1988 |
| CN | 1438656 A | 8/2003 |
| JP | H02-238613 A | 9/1990 |
| JP | 2004-231939 A | 8/2004 |
| JP | 2009-046653 A | 3/2009 |
| JP | 6031197 B2 | 11/2016 |
| JP | 2017-052856 A | 3/2017 |
| JP | 2019-38943 A | 3/2019 |
| WO | 2014-021405 A2 | 2/2014 |
| WO | 2017/122447 A1 | 7/2017 |
| WO | WO-2017209224 A1 * | 12/2017 ............ B29C 59/02 |

OTHER PUBLICATIONS

Database WPI Week 201721, Thomson Scientific, London, GB; AN 2817-187451 XP882882887.
Database WPI Week 200924, Thomson Scientific, London, GB; AN 2809-F56914 XP882882888.
May 21, 2021 Extended Search Report issued in European Patent Application No. 20212656.1.
Feb. 3, 2023 Office Action issued in Chinese Patent Application No. 202011420980.2.

* cited by examiner

*Primary Examiner* — Mark Kopec
*Assistant Examiner* — Jaison P Thomas
(74) *Attorney, Agent, or Firm* — Oliff PLC

(57) ABSTRACT

A composition for forming a metallic luster film, includes: a thiophene polymer, in which a total content of an Fe atom, a Cu atom, an Mn atom, a Cr atom, and a Ce atom in the composition for forming a metallic luster film is 1500 ppm or less with respect to the thiophene polymer.

14 Claims, No Drawings

COMPOSITION FOR FORMING METALLIC LUSTER FILM, METALLIC LUSTER FILM, AND ARTICLE

CROSS-REFERENCE TO RELATED APPLICATIONS

This application is based on and claims priority under 35 USC 119 from Japanese Patent Application No. 2019-225063 filed on Dec. 13, 2019.

BACKGROUND

Technical Field

The present invention relates to a composition for forming a metallic luster film, a metallic luster film, and an article.

Related Art

In the related art, a technique relating to a non-metallic material exhibiting metallic luster instead of a metal is known.

For example, Patent Document 1 discloses "a film having metallic luster containing a thiophene polymer having a distribution peak of a weight average molecular weight in the range of 200 or more and 30,000 or less".

Patent Document 1: International Publication No. 2014/021405

SUMMARY

Aspects of certain non-limiting embodiments of the present disclosure relate to a composition for forming a metallic luster film containing a thiophene polymer, the composition being capable of obtaining a metallic luster film in which unevenness of luster is suppressed as compared with a case where the total content of Fe atom, Cu atom, Mn atom, Cr atom, and Ce atom (hereinafter, also referred to as "content of metal component (A)") exceeds 1500 ppm with respect to the thiophene polymer.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a composition for forming a metallic luster film, containing a thiophene polymer, in which a total content of an Fe atom, a Cu atom, an Mn atom, a Cr atom, and a Ce atom in the composition for forming a metallic luster film is 1500 ppm or less with respect to the thiophene polymer.

DETAILED DESCRIPTION

Hereinafter, exemplary embodiments, which are some of examples of the present invention, will be described in detail.

In the numerical range described in a stepwise manner, the upper limit value or the lower limit value described in a certain numerical range may be replaced with the upper limit value or the lower limit value of another numerical range described in a stepwise manner.

In addition, in the numerical range, the upper limit value or the lower limit value described in a certain numerical range may be replaced with the value shown in the examples.

The amount of each component in the composition means, when a plurality of substances corresponding to each component are present in the composition, the total amount of the plurality of substances present in the composition unless otherwise specified.

In the description, "ppm" is an abbreviation for parts per million and is based on mass.

[Composition for Forming Metallic Luster Film]

A composition for forming a metallic luster film according to an exemplary embodiment contains a thiophene polymer, and a content of a metal component (A) (that is, a total content of Fe atom, Cu atom, Mn atom, Cr atom, and Ce atom) is 1500 ppm or less with respect to the thiophene polymer.

In the related art, a film including a thiophene polymer is an excellent metallic luster film in spite of a film formed of a non-metallic material because the thiophene polymer reflects light by a stack.

However, the metallic luster film containing the thiophene polymer may have unevenness of luster. This is presumably because thiophene is stacked to reflect light and produce metallic luster, so that when the stacked state is collapsed, a non-reflective place is created and unevenness of luster occurs. In addition, it is presumed that the collapse of the stacked state of the thiophene polymer is caused by impurities entering between molecular chains of the thiophene polymer.

Then, it has been found that the impurities causing the collapse of the stacked state of the thiophene polymer are metal components of an oxidizing agent used for oxidative polymerization and an electrolyte used for electrolytic polymerization in the synthesis of the thiophene polymer.

Therefore, in the composition for forming a metallic luster film according to the exemplary embodiment, the content of the metal component (A) is set to a 1500 ppm or less with respect to the thiophene polymer.

Accordingly, the composition for forming a metallic luster film according to the exemplary embodiment may form a metallic luster film in which a component causing collapse of the stacked state of the thiophene polymer is reduced and unevenness of luster is suppressed.

Hereinafter, the composition for forming a metallic luster film according to the exemplary embodiment will be described in detail.

(Content of Metal Component (A))

The content of the metal component (A) (that is, the total content of Fe atom, Cu atom, Mn atom, Cr atom, and Ce atom) in the composition for forming a metallic luster film according to the exemplary embodiment is 1500 ppm or less with respect to the thiophene polymer, but is preferably 500 ppm or less and more preferably 100 ppm or less, from the viewpoint of suppressing unevenness of luster.

However, a small amount of metal component may be contained in order to stabilize the doping state, and the content of the metal component (A) is preferably 1 ppm or more and more preferably 5 ppm or more.

In order to set the content of the metal component (A) within the above range, the following method may be used.

(1) A method in which after synthesis of a thiophene polymer, the obtained thiophene polymer is repeatedly washed with a solvent in which the thiophene polymer is insoluble (for example, an alcohol such as methanol, ethanol, or isopropanol).

(2) A method in which after synthesis of a thiophene polymer, a solution obtained by dissolving the obtained thiophene polymer in a good solvent (such as dimethylformamide, dimethyl sulfoxide, or tetrahydrofuran) is added dropwise to a poor solvent such as alcohol to reprecipitate the thiophene polymer.

(3) A method in which after synthesis of a thiophene polymer, a poor solvent such as alcohol is added dropwise to a solution obtained by dissolving the obtained thiophene polymer in a good solvent (such as dimethylformamide, dimethyl sulfoxide, or tetrahydrofuran), and the thiophene polymer is subjected to reverse reprecipitation.

The content of the metal component (A) is measured as follows.

First, when a measurement target is a solid material, the measurement target is dissolved in nitric acid to obtain a nitric acid solution.

Next, the nitric acid solution is subjected to an ashing treatment with a microwave (maximum reaching temperature=260° C.), and then an aqueous solution in which the ashed product is dissolved or dispersed in water is obtained.

Then, the corresponding metal component is quantified in the obtained aqueous solution by an inductivity coupled plasma optical emission spectrometer (ICP-OES).

On the other hand, in a case where the measurement target is a liquid material, a solid content is obtained after a liquid component is dried from the liquid material. Thereafter, the corresponding metal component is quantified in the same manner as in the case where the measurement target is a solid material.

(Thiophene Polymer)

The thiophene polymer is a polymer in which two or more thiophenes are bonded to each other and polymerized.

The reason why the thiophene polymer exhibits metallic luster is presumed as follows. It is considered that this is because molecules constituting the thiophene polymer are regularly oriented to reflect a specific wavelength. This is also supported by the fact that the produced film shows a sharp peak in X-ray diffraction. This means that in the X-ray diffractometry of the thiophene polymer, there is no halo pattern due to amorphous, and three peaks considered to be derived from the regular structure of the thiophene polymer may be clearly observed in the range of the diffraction angle (2θ) of 5° to 30°.

The thiophene polymer may be polymerized from a single monomer or may be polymerized from a plurality of kinds of monomers.

Examples of the thiophene polymer polymerized from a single monomer include compounds represented by the following general formula (TP).

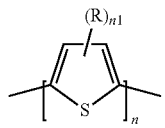

TP

In the general formula (TP), R is a substituent, and is not limited as long as it imparts metallic luster to the film, and represents an alkoxy group, an alkyl group, an amino group, a hydroxy group, a hydroxyalkyl group, an aryl group, a cyano group, or a halogen.

R is preferably an alkoxy group, an alkyl group, an amino group, or a hydroxy group, more preferably an alkoxy group, an alkyl group, or an amino group, and still more preferably an alkoxy group or an alkyl group, from the viewpoint of more reliably obtaining metallic luster in the film.

n1 represents an integer of 1 or 2. That is, R may be one or two in one thiophene ring. When n1 represents an integer of 2, two R's of the thiophene ring may be the same or different.

n represents an integer of 2 or more.

Here, "thiophene" is a sulfur-containing heterocyclic compound represented by the following general formula (TP1). In the following general formula (TP1), R, n1, and n are defined in the same manner as in the general formula (TP).

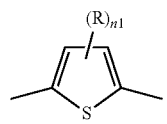

TP1

In the general formula (TP1), when R is an alkoxy group, the number of carbon atoms is preferably 1 or more and 8 or less (particularly preferably 1 or 2). Specific examples of the thiophene include 3-methoxythiophene, 3,4-dimethoxythiophene, 3-ethoxythiophene, 3,4-diethoxythiophene, 3-propoxythiophene, 3-butoxythiophene, 3-hydroxythiophene, 3,4-ethylenedioxythiophene, and 3,4-propylenedioxythiophene.

In particular, when the number of carbon atoms of the alkoxy group is 1 or 2, the layer-like orientational structure of the thiophene polymer may be effectively exhibited.

In the general formula (TP1), when R is an alkyl group, the number of carbon atoms is preferably 1 or more and 12 or less (particularly preferably 1 or 2). Specific examples of the thiophene include 3-methylthiophene, 3,4-dimethylthiophene, 3-ethylthiophene, 3,4-diethylthiophene, 3-butylthiophene, 3-hexylthiophene, 3-heptylthiophene, 3-octylthiophene, 3-nonylthiophene, 3-decylthiophene, 3-undecylthiophene, 3-dodecylthiophene, and 3-bromo-4-methylthiophene.

In particular, when the number of carbon atoms of the alkyl group is 1 or 2, the layer-like orientational structure of the thiophene polymer may be effectively exhibited.

When R in the general formula (TP1) is an amino group, examples of the thiophene include 3-aminothiophene, 3,4-diaminothiophene, 3-methylaminothiophene, 3-dimethylaminothiophene, 3-thiophenecarboxamide, and 4-(thiophen-3-yl) aniline. In this case, when carbon is contained in the amino group, the number of carbon atoms of the amino group is also preferably 1 or 2.

That is, among these, the thiophene polymer is preferably a polymer of at least one selected from the group consisting of alkoxythiophene, aminothiophene, hydroxythiophene, and alkylthiophene, and more preferably a polymer of at least one selected from the group consisting of alkoxythiophene and alkylthiophene, from the viewpoint of more reliably obtaining metallic luster in the film.

From the same viewpoint, each of an alkoxy group of the alkoxythiophene and an alkyl group of the alkylthiophene has preferably 1 or more and 6 or less (particularly preferably 1 or 2) carbon atoms.

The thiophene polymer is preferably a thiophene polymer having a distribution peak of the weight average molecular weight in the range of 200 or more and 30,000 or less (preferably 500 or more and 20,000 or less, and more preferably 10,000 or less) from the viewpoint of more reliably obtaining metallic luster in the film. That is, the thiophene polymer is preferably a so-called oligomer.

By controlling the molecular weight of the thiophene polymer within the above range, the layer-like orientational structure of the thiophene polymer may be effectively exhibited.

Here, the weight average molecular weight is a value measured by gel permeation chromatography (GPC). Specifically, the molecular weight measurement by GPC is performed by using HPLC1100 manufactured by Tosoh Corporation as a measurement apparatus, using a column TSKgel GMHHR-M+TSKgel GMHHR-M (7.8 mmI.D.×30 cm) manufactured by Tosoh Corporation, and using chloroform as a solvent. Then, the weight average molecular weight (Mw) is calculated from the measurement results using a molecular weight calibration curve prepared from a monodisperse polystyrene standard sample.

(Synthesis of Thiophene Polymer)

The thiophene polymer is obtained by, for example, an oxidative polymerization method or an electrolytic polymerization method.

<Oxidative Polymerization Method>

The oxidative polymerization method is a method of polymerizing thiophene in at least one of a liquid phase and a solid phase using an oxidizing agent.

Examples of the oxidizing agent include a ferric salt, a cupric salt, a cerium salt, a dichromate, a permanganate, ammonium persulfate, boron trifluoride, a bromate, hydrogen peroxide, chlorine, bromine, and iodine.

Among these, a ferric salt is preferable. Note that the ferric salt may be a hydrate.

Examples of the ion paired with the ferric salt include a chloride ion, a citrate ion, an oxalate ion, a paratoluenesulfonate ion, a perchlorate ion, a hexafluorophosphate ion, and a tetrafluoroborate ion. Among these ions, it is preferable to use at least one of a perchlorate ion, a hexafluorophosphate ion, and a tetrafluoroborate ion because metallic luster close to gold may be obtained. The reason why metallic luster close to gold may be obtained is presumed to be that a perchlorate ion, a hexafluorophosphate ion, and a tetrafluoroborate ion are incorporated into the thiophene polymer as a dopant during polymerization, and bond to the cation site generated in the thiophene polymer to be stabilized, thereby contributing to formation of a regular structure. In fact, when a film having metallic luster is analyzed, it is confirmed that these substances exist stably.

The oxidative polymerization method is preferably carried out in a solvent.

As the solvent, a solvent capable of sufficiently dissolving the oxidizing agent and thiophene and efficiently polymerizing the thiophene is applied. The solvent is preferably an organic solvent having high polarity and a certain degree of volatility.

Specific examples of the solvent include acetonitrile, nitromethane, γ-butyrolactone, propylene carbonate, nitromethane, 1-methyl-2-pyrrolidinone, dimethyl sulfoxide, 2-butanone, tetrahydrofuran, acetone, methanol, anisole, chloroform, ethyl acetate, hexane, trichloroethylene, cyclohexanone, dichloromethane, dimethylformamide, ethanol, butanol, pyridine, dioxane, and mixtures thereof.

Among these, acetonitrile, nitromethane, γ-butyrolactone, and propylene carbonate are preferable as the solvent. These solvents are preferable because the thiophene polymer is soluble therein and a film having better metallic luster is easily formed.

Here, the amount of thiophene and the oxidizing agent with respect to the solvent can be appropriately adjusted and is not limited, but when the weight of the solvent is 1, the weight of thiophene is preferably 0.00007 or more and 7 or less, and more preferably 0.0007 or more and 0.7 or less, and the weight of the oxidizing agent is preferably 0.0006 or more and 6 or less, and more preferably 0.006 or more and 0.6 or less in the case where the oxidizing agent is iron(III) perchlorate n-hydrate.

As for the ratio of thiophene to the oxidizing agent, when the weight of thiophene is 1, the weight of the oxidizing agent is preferably 0.1 or more and 1,000 or less, and more preferably 1 or more and 100 or less.

The thiophene and the oxidizing agent may be added to the solvent at one time, or two kinds of solutions, i.e., a solution in which thiophene is added to the solvent and a solution in which the oxidizing agent is added to the solvent, may be separately prepared and added to each other to perform the polymerization reaction.

The thiophene polymer synthesized by the oxidative polymerization method may be used as a solution as it is, or may be used as a powdered thiophene polymer (hereinafter, referred to as "thiophene polymer powder") after removing the solvent.

When an oxidizing agent containing the perchlorate ion, the hexafluorophosphate ion, the tetrafluoroborate ion, or the chloride ion is used, the oxidizing agent remains because it is stably bonded to the polymer, and the state of metallic luster may be stably maintained.

<Electrolytic Polymerization Method>

The electrolytic polymerization method refers to a method of forming a solution-insoluble polymer (in other words, film of the solution-insoluble polymer) on a conductor by dissolving a substance to be a precursor of a polymer (that is, monomer) in a solution containing a supporting electrolyte and then subjecting the monomer to electrode oxidation.

In the electrolytic polymerization method, it is preferable to use a potential sweep method when anodizing. The potential sweep method refers to a treatment in which a pair of electrodes is immersed in a solution containing a supporting electrolyte and a potential is applied while being changed at a constant rate.

Examples of solvents for the electrolytic solutions include, but are not limited to, water, alcohols, and the solvents described in Akira Fujishima, Masuo Aizawa, and Toru Inoue, "Method of Electrochemical Measurement", Gihodo Shuppan, Volume One, pp. 107-114, 1984. A mixed solvent of various solvents is also preferable.

The supporting electrolyte of the electrolytic solution is an essential component in electrolysis, and examples thereof include an electrolyte containing, as a constituent element, a cation or an anion which is sufficiently dissolved in a solvent and hardly electrolyzed.

Specifically, the supporting electrolyte is preferably, for example, a lithium salt, a sodium salt, a potassium salt, a calcium salt, or a tetraalkylammonium salt when focusing on a cation, and is preferably, for example, a halide, a sulfate, a nitrate, a phosphate, a perchlorate, a boron trifluoride salt, or a hexafluorophosphate salt when focusing on an anion.

The concentration of the supporting electrolytes is not limited, but is preferably 0.001 M or more and not more than the solubility, and more preferably 0.01 M or more and 1 M or less.

The concentration of thiophene which is a monomer in the electrolytic solution is not limited, but is preferably 0.1 mM or more and not more than the solubility, and more specifically, more preferably 1 mM or more and 1 M or less.

In the electrolytic polymerization, a three-electrode system in which a conductor (functioning as a working electrode) is immersed in an electrolytic vessel containing a solution and three electrodes including the working electrode, a counter electrode and, if necessary, a reference electrode serving as a potential reference are used, or a two-electrode system in which only a conductor and a counter electrode are used may be employed.

Note that the three-electrode system in which the potential of the conductor may be strictly defined with respect to the reference electrode serving as a reference is more preferable in that an article having metallic luster containing the thiophene polymer formed by this method may be manufactured with high reproducibility.

In any of the three-electrode system and the two-electrode system, the conductor as the working electrode may be a substance that is stable against electrode oxidation. For example, as described above, an electrode (such as a transparent glass electrode, a metal electrode, or a glassy carbon electrode) coated with a conductive film of indium tin oxide (hereinafter abbreviated as "ITO"), tin oxide, or the like may be suitably used. As the counter electrode, in addition to the above electrode materials, a metal electrode such as a stainless steel plate or a copper plate may be preferably used. As the reference electrode, for example, a silver/silver chloride electrode (Ag/AgCl electrode) or a saturated calomel electrode may be preferably used.

In the potential sweep method in the electrolytic polymerization method, sweeping is preferably performed between a negative potential and a positive potential. In this case, the negative potential is preferably in the range of −1.5 V or more and −0.01 V or less, more preferably in the range of −1.0 V or more and −0.1 V or less, and still more preferably in the range of −0.7 V or more and −0.2 V or less. The positive potential is preferably in the range of +1.0 V or more and +3.0 V or less, more preferably in the range of +1.0 V or more and +2.0 V or less, and still more preferably in the range of +1.0 V or more and +1.5 V or less.

In the potential sweep method, the sweep speed is not limited as long as an article having metallic luster can be produced, but is preferably in the range of 0.1 mV/sec or more and 10 V/sec or less, more preferably in the range of 1 mV/sec or more and 1 V/sec or less, and still more preferably in the range of 2 mV/sec or more and 300 mV/sec or less.

The time of the electrolytic polymerization is preferably in the range of 1 second or more and 5 hours or less and more preferably in the range of 10 seconds or more and 1 hour or less within the range of the applied voltage.

The temperature of electrolysis during the electrolytic polymerization is preferably in the range of −20° C. or higher and 60° C. or lower.

The electrolysis during the electrolytic polymerization is a reaction in which component substances in the atmosphere are less involved and is performed at a relatively low potential, and thus can be carried out in the atmosphere. From the viewpoint of avoiding the possibility of contamination of the formed film such as oxidation of impurities in the electrolytic solution, it is preferable to carry out the reaction in a nitrogen gas or argon gas atmosphere, but there is almost no fear of contamination. However, when the electrolytic polymerization is formed, if a large amount of oxygen is present in the solution, there is a concern that the electrode reaction may be affected. Therefore, it is also useful to perform bubbling using an inert gas (such as nitrogen gas or argon gas).

(Others)

The composition for forming a metallic luster film according to the exemplary embodiment may be a liquid composition or a solid composition.

In the case of a liquid composition, examples of the composition for forming a metallic luster film include a coating liquid in which a thiophene polymer subjected to a treatment such as a washing treatment, a reprecipitation treatment, or a reverse reprecipitation treatment is dissolved in a solvent, as described above.

In the case of a solid composition, examples of the composition for forming a metallic luster film include a toner and a powder coating material obtained by using a thiophene polymer subjected to a treatment such as a washing treatment, a reprecipitation treatment, or a reverse reprecipitation treatment as described above.

For example, the toner may be a toner in which a thiophene polymer is added to toner particles by internal addition or external addition, or by internal addition and external addition.

The composition for forming a metallic luster film according to the exemplary embodiment may contain additives such as a fluidizing material, a charge control material, a binder resin, a filler, and a lubricant.

Specifically, for example, in the case where the composition for forming a metallic luster film is a toner, for example, an internal additive (such as a binder resin, a magnetic material (iron powder or the like), wax, or a charge control agent) or an external additive (such as silica particles or titania particles) may be contained.

(Metallic Luster Film)

The metallic luster film according to the exemplary embodiment is a film formed using the composition for forming a metallic luster film according to the exemplary embodiment.

That is, the metallic luster film according to the exemplary embodiment is a film satisfying the content of the metal component (A) described in the composition for forming a metallic luster film according to the exemplary embodiment.

Therefore, the metallic luster film according to the exemplary embodiment becomes a metallic luster film in which unevenness of luster is suppressed.

When a liquid composition for forming a metallic luster film is used, the metallic luster film according to the exemplary embodiment is formed by a spin coating method, a bar coating method, a dip coating method, a drop casting method, or the like. The drop casting method and the dip coating method are suitable for forming a film thick enough to have metallic luster.

On the other hand, when the solid composition for forming a metallic luster film is used, the metallic luster film according to the exemplary embodiment is formed according to the aspect of the solid composition for forming a metallic luster film. Specifically, when the solid composition for forming a metallic luster film is a toner, the metallic luster film according to the exemplary embodiment is formed by an electrophotographic method.

It is preferable to pressurize after forming the metallic luster film. By pressurizing, the metallic luster film is stably fixed on the article to be formed.

Here, "pressurizing" refers to applying pressure to the metallic luster film, and so-called "rubbing" is also included in the pressurization to the metallic luster film.

The thickness of the metallic luster film is preferably a thickness capable of exhibiting metallic luster. Specifically, the thickness of the metallic luster film is preferably 0.01 μm or more.

(Article)

The article according to the exemplary embodiment is an article having the metallic luster film according to the exemplary embodiment.

Examples of articles on which the metallic luster film is to be formed include furniture, toys, miscellaneous goods, clothing, paper products, and packaging. However, these are examples, and there is no particular limitation as long as it is an article on which a metallic luster film can be formed.

The material of the article is preferably a polymer compound or glass in terms of ease of formation of the metallic luster film and reduction in production cost.

EXAMPLES

Hereinafter, the present invention will be described in more detail with reference to Examples. However, these Examples do not limit the present invention.

Example 1

Thiophene polymer powder (A) is obtained as follows.

11.4 g of 3-methoxythiophene is collected in a three-necked flask, dissolved in 0.5 L of acetonitrile, the inside of the system is replaced with nitrogen, and then cooled to 0° C. A reaction solution prepared by dissolving 101 g of iron(III) perchlorate n-hydrate in 0.5 L of acetonitrile is added dropwise thereto while maintaining the temperature at 5° C. or lower. Thereafter, the temperature is raised to room temperature (specifically, 24° C.), and the mixture is stirred at room temperature for 15 hours. Then 1 L of methanol is added, and the mixture is further stirred for 1 hour. This liquid containing the thiophene polymer is separated into a liquid and a solid by a centrifugal separator, and the solid is collected and dried under reduced pressure at 60° C. for 16 hours to obtain 10.5 g of a thiophene polymer (A).

Next, the obtained thiophene polymer (A) is subjected to a washing treatment. Specifically, it is as follows.

2.0 g of the thiophene polymer (A) is placed in a beaker, 50 mL of methanol is added, and the mixture is stirred at 45° C. for 1 hour. This liquid is separated into a liquid and a solid by a centrifugal separator, and the solid is collected, transferred to a beaker, added with 50 mL of methanol, and stirred at 45° C. for 1 hour. Thereafter, this liquid is separated into a liquid and a solid by a centrifugal separator, and the solid is separated, collected and dried under reduced pressure at 60° C. for 16 hours to obtain 1.8 g of a thiophene polymer (B).

Next, 1 g of the treated thiophene polymer (B) is added to 100 g of γ-butyrolactone to obtain a coating liquid.

Example 2

The thiophene polymer (A) obtained in Example 1 is subjected to purification treatment. Specifically, it is as follows.

2.0 g of the thiophene polymer (A) is dissolved in 100 mL of DMF, and the mixture is added dropwise to 500 mL of isopropyl alcohol over 30 minutes with stirring, thereby performing purification treatment to precipitate a solid little by little. This liquid is separated into a liquid and a solid by a centrifugal separator, and the solid is collected and dried under reduced pressure at 60° C. for 16 hours to obtain 1.85 g of a thiophene polymer (C).

Next, a coating liquid is obtained in the same manner as in Example 1 using the treated thiophene polymer (C).

Example 3

The thiophene polymer (A) obtained in Example 1 is subjected to purification treatment. Specifically, it is as follows.

2.0 g of the thiophene polymer (A) is dissolved in 100 mL of DMF, and 1 L of isopropyl alcohol is added dropwise to the mixture over 30 minutes with stirring, thereby performing purification treatment to precipitate a solid little by little. This liquid is separated into a liquid and a solid by a centrifugal separator, and the solid is collected, transferred to a beaker, added with 50 mL of methanol, and stirred at 45° C. for 1 hour. Thereafter, this liquid is separated into a liquid and a solid by a centrifugal separator, and the solid is separated, collected and dried under reduced pressure at 60° C. for 16 hours to obtain 1.8 g of a thiophene polymer (D).

Next, a coating liquid is obtained in the same manner as in Example 1 using the treated thiophene polymer (D).

Example 4

3.1 g of 3-butoxythiophene is collected in a three-necked flask, dissolved in 0.1 L of acetonitrile, the inside of the system is replaced with nitrogen, and then cooled to 0° C. A reaction solution prepared by dissolving 20 g of iron(III) perchlorate n-hydrate in 0.1 L of acetonitrile is added dropwise thereto while maintaining the temperature at 5° C. or lower. Thereafter, the temperature is raised to room temperature (specifically, 24° C.), and the mixture is stirred at room temperature for 15 hours. Then 0.2 L of methanol is added, and the mixture is further stirred for 1 hour. This liquid containing the thiophene polymer is separated into a liquid and a solid by a centrifugal separator, and the solid is collected and dissolved in 100 mL of DMF, and 1 L of isopropyl alcohol is added dropwise to the mixture over 30 minutes with stirring thereby performing purification treatment to precipitate a solid little by little. This liquid is separated into a liquid and a solid by a centrifugal separator, and the solid is collected, transferred to a beaker, added with 50 mL of methanol, and stirred at 45° C. for 1 hour. Thereafter, this liquid is separated into a liquid and a solid by a centrifugal separator, and the solid is separated, collected and dried under reduced pressure at 60° C. for 16 hours to obtain 1.9 g of a thiophene polymer (F).

Next, a coating liquid is obtained in the same manner as in Example 1 using the treated thiophene polymer (F).

Example 5

0.02 g of 3-methylthiophene and 2.05 g of 3-methoxythiophene are collected in a three-necked flask, dissolved in 0.1 L of acetonitrile, the inside of the system is replaced with nitrogen, and then cooled to 0° C. A reaction solution prepared by dissolving 20 g of iron(III) perchlorate n-hydrate in 0.1 L of acetonitrile is added dropwise thereto while maintaining the temperature at 5° C. or lower. Thereafter, the temperature is raised to room temperature (specifically, 24° C.), and the mixture is stirred at room temperature for 15 hours. Then 0.2 L of methanol is added, and the mixture is further stirred for 1 hour. This liquid containing the thiophene polymer is separated into a liquid and a solid by a centrifugal separator, and the solid is collected and dissolved in 100 mL of DMF, and 1 L of isopropyl alcohol is added dropwise to the mixture over 30 minutes with stirring thereby performing purification treatment to precipitate a solid little by little. This liquid is separated into a liquid and a solid by a centrifugal separator, and the solid is collected, transferred to a beaker, added with 50 mL of methanol, and stirred at 45° C. for 1 hour. Thereafter, this liquid is separated into a liquid and a solid by a centrifugal separator, and the solid is separated, collected and dried under reduced pressure at 60° C. for 16 hours to obtain 1.9 g of a thiophene polymer (G).

Next, a coating liquid is obtained in the same manner as in Example 1 using the treated thiophene polymer (G).

Example 6

0.03 g of 3,4-ethylenedioxythiophene and 2.05 g of 3-methoxythiophene are collected in a three-necked flask, dissolved in 0.1 L of acetonitrile, the inside of the system is replaced with nitrogen, and then cooled to 0° C. A reaction solution prepared by dissolving 20 g of iron(III) perchlorate n-hydrate in 0.1 L of acetonitrile is added dropwise thereto while maintaining the temperature at 5° C. or lower. Thereafter, the temperature is raised to room temperature (specifically, 24° C.), and the mixture is stirred at room temperature for 15 hours. Then 0.2 L of methanol is added, and the mixture is further stirred for 1 hour. This liquid containing the thiophene polymer is separated into a liquid and a solid by a centrifugal separator, and the solid is collected and dissolved in 100 mL of DMF, and 1 L of isopropyl alcohol is added dropwise to the mixture over 30 minutes with stirring thereby performing purification treatment to precipitate a solid little by little. This liquid is separated into a liquid and a solid by a centrifugal separator, and the solid is collected, transferred to a beaker, added with 50 mL of methanol, and stirred at 45° C. for 1 hour. Thereafter, this liquid is separated into a liquid and a solid by a centrifugal separator, and the solid is separated, collected and dried under reduced pressure at 60° C. for 16 hours to obtain 1.9 g of a thiophene polymer (H).

Next, a coating liquid is obtained in the same manner as in Example 1 using the treated thiophene polymer (H).

Example 7

2.28 g of 3-methoxythiophene is collected in a three-necked flask, dissolved in 0.1 L of acetonitrile, the inside of the system is replaced with nitrogen, and then cooled to 0° C. A reaction solution prepared by dissolving 24.5 g of copper(II) tetrafluoroborate hexahydrate in 0.1 L of acetonitrile is added dropwise thereto while maintaining the temperature at 5° C. or lower. Thereafter, the temperature is raised to room temperature (specifically, 24° C.), and the mixture is stirred at room temperature for 15 hours. Then 0.2 L of methanol is added, and the mixture is further stirred for 1 hour. This liquid containing the thiophene polymer is separated into a liquid and a solid by a centrifugal separator, and the solid is collected and dissolved in 100 mL of DMF, and 1 L of isopropyl alcohol is added dropwise to the mixture over 30 minutes with stirring thereby performing purification treatment to precipitate a solid little by little. This liquid is separated into a liquid and a solid by a centrifugal separator, and the solid is collected, transferred to a beaker, added with 50 mL of methanol, and stirred at 45° C. for 1 hour. Thereafter, this liquid is separated into a liquid and a solid by a centrifugal separator, and the solid is separated, collected and dried under reduced pressure at 60° C. for 16 hours to obtain 2.0 g of a thiophene polymer (I).

Next, a coating liquid is obtained in the same manner as in Example 1 using the treated thiophene polymer (I).

Example 8

The thiophene polymer (A) obtained in Example 1 is subjected to purification treatment. Specifically, it is as follows.

2.0 g of the thiophene polymer (A) is dissolved in 100 mL of DMF, and the mixture is added dropwise to 500 mL of isopropyl alcohol over 30 minutes with stirring, thereby performing purification treatment to precipitate a solid little by little. This liquid is separated into a liquid and a solid by a centrifugal separator, and the solid is collected and dried under reduced pressure at 60° C. for 16 hours to obtain 1.85 g of a thiophene polymer (J).

Next, the entire amount of the treated thiophene polymer (J) is placed on a 100×100 mm glass substrate. Further, a urethane blade is brought into contact with the glass substrate at a contact angle of 45° and a linear pressure of 50 gf/mm, and repeatedly rubbed 50 times to obtain a metallic luster film having a film thickness of about 0.5 μm.

Comparative Example 1

The thiophene polymer powder (A) obtained in Example 1 is used to obtain a coating liquid in the same manner as in Example 1.

Comparative Example 2

The thiophene polymer (A) obtained in Example 1 is washed as follows.

2.0 g of the thiophene polymer (A) is placed in a beaker, 50 mL of methanol is added, and the mixture is stirred for 1 hour. This liquid is separated into a liquid and a solid by a centrifugal separator and the solid is collected and dried under reduced pressure at 60° C. for 16 hours to obtain 1.8 g of a thiophene polymer (E).

Next, a coating liquid is obtained in the same manner as in Example 1 using the treated thiophene polymer (E).
(Evaluation)
<Various Characteristics>

The content of the metal component (A) in the coating liquid of each example and the metallic luster film formed from the coating liquid of each example is measured by the method described above.
<Unevenness of Luster>

A metallic luster film is formed using the coating liquids of each example. Specifically, it is as follows.

Each of the coating liquids prepared in Examples 1 to 7 and Comparative Examples is applied onto a 100×100 mm glass substrate using a gap coater, air-dried at room temperature (specifically, 24° C.) for 15 minutes, and then dried at 80° C. for 1 hour to prepare a metallic luster film having a film thickness of about 0.5 μm.

Then, the metallic luster films formed using the coating liquids prepared in Examples 1 to 7 and Comparative Examples and the metallic luster film formed in Example 8 are evaluated for unevenness of luster as follows.

The metallic luster of the obtained metallic luster film is visually observed under a fluorescent lamp of about 500 lux.

The evaluation criteria are as follows.

A: There is uniform metallic luster over the entire surface.

B: There is a portion which seems to be cloudy depending on the angle (practically no serious problem).

C: The edge of the coating film is slightly cloudy (practically no problem).

D: There is a cloudy portion other than the end (there is a practical problem).

E: There is no metallic luster.

TABLE 1

| | Thiophene polymer | Metal component (A) | | Unevenness of luster |
|---|---|---|---|---|
| | | Kind | Amount (ppm) | |
| Example 1 | (B) | Fe | 1450 | C |
| Example 2 | (C) | Fe | 480 | B |
| Example 3 | (D) | Fe | 20 | A |
| Example 4 | (F) | Fe | 15 | A |
| Example 5 | (G) | Fe | 25 | A |
| Example 6 | (H) | Fe | 50 | A |
| Example 7 | (I) | Cu | 45 | A |
| Example 8 | (J) | Fe | 1450 | B |
| Comparative Example 1 | (A) | Fe | 2500 | E |
| Comparative Example 2 | (E) | Fe | 1600 | D |

From the above results, it is found that in the present examples, the unevenness of luster of the metallic luster film is suppressed as compared with the comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A composition for forming a metallic luster film, the composition comprising:
   an alkoxythiophene polymer,
   wherein a total content of an Fe atom, a Cu atom, an Mn atom, a Cr atom, and a Ce atom in the composition for forming a metallic luster film is 15 ppm or more to 1500 ppm or less with respect to the alkoxythiophene polymer.

2. The composition for forming a metallic luster film according to claim 1,
   wherein the total content of the Fe atom, the Cu atom, the Mn atom, the Cr atom, and the Ce atom in the composition for forming a metallic luster film is 15 ppm or more to 500 ppm or less with respect to the alkoxythiophene polymer.

3. The composition for forming a metallic luster film according to claim 2,
   wherein the total content of the Fe atom, the Cu atom, the Mn atom, the Cr atom, and the Ce atom in the composition for forming a metallic luster film is 15 ppm or more to 100 ppm or less with respect to the alkoxythiophene polymer.

4. The composition for forming a metallic luster film according to claim 1,
   wherein an alkoxy group of the alkoxythiophene has 1 or more and 6 or less carbon atoms.

5. The composition for forming a metallic luster film according to claim 1,
   wherein the composition for forming a metallic luster film is a liquid composition.

6. The composition for forming a metallic luster film according to claim 1,
   wherein the composition for forming a metallic luster film is a solid composition.

7. The composition for forming a metallic luster film according to claim 1,
   wherein an alkoxy group of the alkoxythiophene has 1 or 2 carbon atoms.

8. A metallic luster film, comprising:
   an alkoxythiophene polymer, wherein a total content of an Fe atom, a Cu atom, an Mn atom, a Cr atom, and a Ce atom in the metallic luster film is 15 ppm or more to 1500 ppm or less with respect to the alkoxythiophene polymer.

9. The metallic luster film according to claim 8,
   wherein the total content of the Fe atom, the Cu atom, the Mn atom, the Cr atom, and the Ce atom in the metallic luster film is 15 ppm or more to 500 ppm or less with respect to the alkoxythiophene polymer.

10. The metallic luster film according to claim 9,
    wherein the total content of the Fe atom, the Cu atom, the Mn atom, the Cr atom, and the Ce atom in the metallic luster film is 15 ppm or more to 100 ppm or less with respect to the alkoxythiophene polymer.

11. The metallic luster film according to claim 8,
    wherein each of an alkoxy group of the alkoxythiophene has 1 or more and 6 or less carbon atoms.

12. The metallic luster film according to claim 8,
    wherein an alkoxy group of the alkoxythiophene has 1 or 2 carbon atoms.

13. An article comprising:
    a metallic luster film that comprises an alkoxythiophene polymer,
    wherein a total content of an Fe atom, a Cu atom, an Mn atom, a Cr atom, and a Ce atom in the metallic luster film is 15 ppm or more to 1500 ppm or less with respect to the alkoxythiophene polymer.

14. The article according to claim 13,
    wherein an alkoxy group of the alkoxythiophene has 1 or 2 carbon atoms.

\* \* \* \* \*